(12) United States Patent
Archer

(10) Patent No.: US 7,062,129 B2
(45) Date of Patent: Jun. 13, 2006

(54) FIBER OPTIC ILLUMINATING APPARATUS AND METHOD

(75) Inventor: Roy Archer, Ocoee, FL (US)

(73) Assignee: Super Vision International, Inc., Orlando, FL (US)

( * ) Notice: Subject to any disclaimer, the term of this patent is extended or adjusted under 35 U.S.C. 154(b) by 116 days.

(21) Appl. No.: 10/302,273

(22) Filed: Nov. 25, 2002

(65) Prior Publication Data

US 2004/0101244 A1    May 27, 2004

(51) Int. Cl.
*G02B 6/26*    (2006.01)
(52) U.S. Cl. .................... 385/39; 385/15; 362/554
(58) Field of Classification Search ............ 385/39, 385/15; 362/554
See application file for complete search history.

(56) References Cited

U.S. PATENT DOCUMENTS

| 3,051,035 | A |   | 8/1962  | Root |
|---|---|---|---|---|
| 4,884,865 | A | * | 12/1989 | Grise .................... 385/115 |
| 4,986,622 | A |   | 1/1991  | Martinez |
| 5,259,056 | A |   | 11/1993 | Davenport et al. |
| 5,396,571 | A |   | 3/1995  | Saadatmanesh et al. |
| 5,513,291 | A |   | 4/1996  | Buchin et al. |
| 5,528,714 | A |   | 6/1996  | Kingstone et al. |
| 5,803,575 | A | * | 9/1998  | Ansems et al. ............ 362/554 |
| 5,838,860 | A |   | 11/1998 | Kingstone et al. |
| 6,089,741 | A | * | 7/2000  | Chen et al. .................. 362/583 |
| 6,422,730 | B1|   | 7/2002  | Koren et al. |

* cited by examiner

*Primary Examiner*—Jennifer Doan
(74) *Attorney, Agent, or Firm*—Akerman Senterfitt

(57) ABSTRACT

An illuminating apparatus may include a housing and a lamp assembly to produce a beam of light transmitted to a fiber optic cable. An insulating device for insulating an input end of the fiber optic cable from heat may be disposed between the input end of the fiber optic cable and the lamp assembly. The insulating device may be a fused bundle of glass fiber that insulates the input end of the fiber optic cable. A method for retrofitting fiber optic light sources may include removing a fiber head from the light source and inserting a fiber optic glass to insulate the input end of a fiber optic cable from heat generated within the light source.

14 Claims, 2 Drawing Sheets

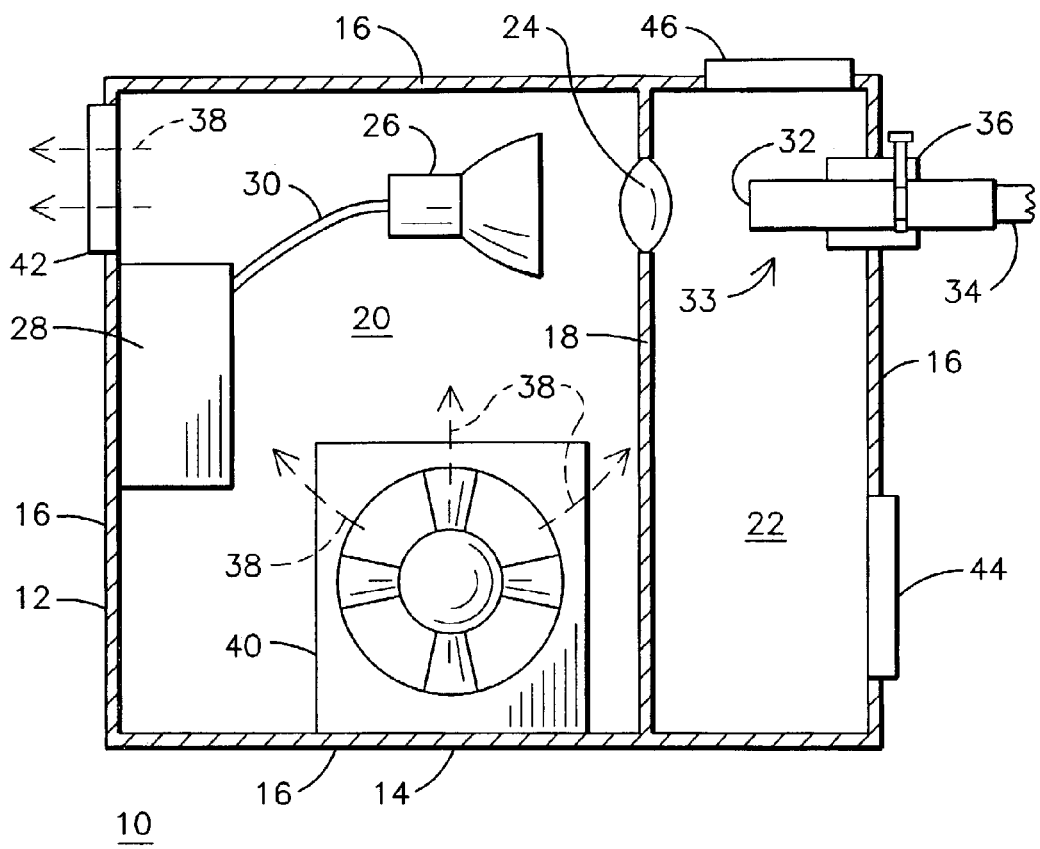
FIG. 1
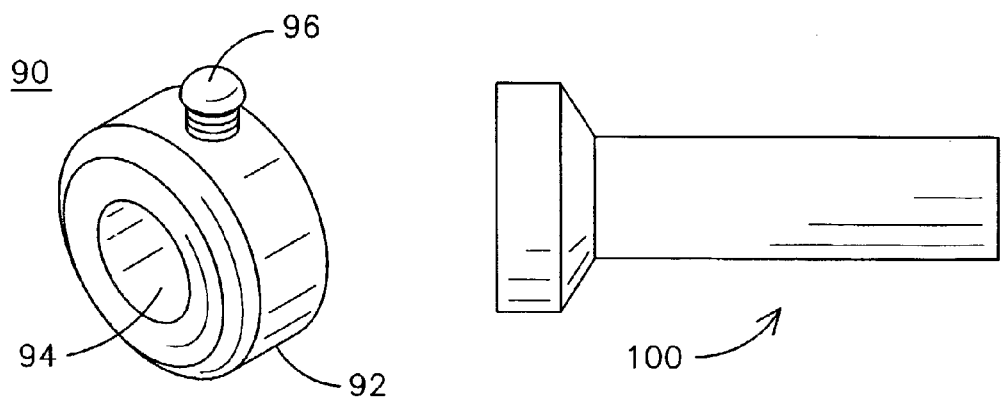
FIG. 4
FIG. 5

FIBER OPTIC ILLUMINATING APPARATUS AND METHOD

BACKGROUND OF THE INVENTION

This invention relates in general to lighting systems employing fiber optics and in particular to a fiber optic illuminating apparatus configured for coupling light emitted from a high-energy light source to the input end of a fiber optic cable for transmission to light emitting fixtures.

Illuminating apparatuses such as fiber optic lighting systems, for example, are used in a variety of applications to provide a cool, flexible, safe source of light. The assignee of the present invention provides fiber optic light systems for use in signs, displays, swimming pools, landscapes and general area lighting. One such fiber optic light system for providing multi-color light effects is described in U.S. Pat. No. 5,528,714 issued Jun. 18, 1996, to Kingstone et al., assigned to the assignee of the present invention and incorporated by reference herein. A fiber optic lighting system may typically include a light source having a fiber optic cable bundle for transmitting light from the light source to a location remote from the light source. The light source may include an enclosure containing a light bulb, a means for securing the end of a fiber optic cable bundle near the light bulb, a power supply or other electronic equipment, and a fan for providing cooling air to the enclosure.

One of the limiting characteristics of a fiber optic light system is the amount of light that can be delivered from the fiber optic cable. The output of the system depends upon numerous variables, such as the intensity of the light produced by the bulb, the effectiveness of the delivery of the light into the fiber end, and the efficiency of the transmission of the light by the fiber optic cable. A fiber optic light system is disclosed in U.S. Pat. No. 6,422,730 issued Jul. 23, 2002, to Koren et al., which is incorporated herein by reference, which provides multiple cooling devices to cool the ambient temperature of the system and the input end of a fiber optic cable.

It is known to increase the amount of light introduced at the inlet end of the fiber optic cable bundle in order to increase the amount of light produced by the system. However, light bulbs used to produce such light, for example incandescent and halogen lamps, produce a significant amount of heat energy along with the visible light energy. As the power of the light bulb is increased and the bulb is placed closer to the ends of the fiber optic cables it becomes increasingly difficult to provide cooling for the cable ends. It is known that plastic cable fibers will melt at approximately 175 degrees Fahrenheit. Even local melting of the cable may cause a depression in the cable end, thus causing the cooling air to become stagnant and intensifying the local heating effect. In this manner, even a small local hot spot will quickly destroy the functionality of a cable fiber. Therefore, in order to improve the performance of a fiber optic light source, it may be beneficial to provide additional means to protect the cable ends against melting. U.S. Pat. No. 5,838,860 issued Nov. 17, 1998, to Kingstone et al., assigned to the assignee of the present invention and incorporated herein by reference, describes the use of a plate of heat absorbing material as part of a temperature control scheme within the enclosure of a fiber optic illumination system. In many designs of fiber optic lighting systems the factor limiting the brightness that can be achieved in the fiber optic cable is the cooling of the cable ends.

Fiber optic light sources generally include an apparatus for positioning a bulb and an associated reflector along an optical axis to direct a beam of light through a lens to the fiber ends. Such an apparatus can be seen in FIG. 2 of the aforementioned U.S. Pat. No. 5,838,860. The reflector design described in that patent is a one piece glass reflector having a generally truncated ellipsoid reflecting portion formed to be integral with a rearward rectangular or rounded base portion. The bulb is typically affixed within the base portion of the reflector with a high temperature adhesive. The fiber optic cable ends are held in position by a ferrule assembly that is attached to the light source housing. The ferrule and reflector are positioned relative to each other by an optical bench.

In a light source for a fiber optic system it is beneficial to provide local cooling to the ends of the cable bundle fibers and general cooling for the bulb and other components included in the light source enclosure. The large amount of heat generated by the bulb and other electronics within the enclosure often requires a supply of a high volume of cooling air. However, for cooling the cable end, the volume of air is not as beneficial as is the velocity of the air, due to the geometry of the cable end and the relatively poor thermal conductivity of the air. In order to provide the required velocity for cooling the fiber end, some systems have used fans that are much larger than necessary for the general cooling requirements. As a result, such fans may consume more electrical power than is necessary for the overall application requirements. Cooling fans have also proven to be noisy, which may severely restrict their use such as in areas where quiet operation is necessary. Furthermore, some fiber optic cable systems incorporating the higher light output of metal halide lamps have been limited in their application. Although these lamps produce more visible light than incandescent and halogen lamps, they also produce more infrared and ultraviolet energy, thereby making it more difficult to provide the necessary cooling to the fiber ends in order to take advantage of these higher output lamps.

In view of the above, it would be advantageous to provide an improved fiber optic lighting system capable of providing a higher level of light intensity to the input end of a fiber optic cable while ensuring that the fiber optic cable is not subjected to damage causing heat. It would also be advantageous to provide a device for coupling light emitted from a high intensity light source to the fiber optic cable that maintains the integrity of the light transmission and focal point in front of the cable, insulates the exposed ends of the fiber optic cable from heat, dissipates heat generated within the system and significantly reduces noise generated by the system.

BRIEF SUMMARY OF THE INVENTION

An apparatus for insulating an input end of a fiber optic cable against heat generated by a lighting system during operation and coupling a beam of light emitted from a high energy light source within the fiber optic lighting system with the input end of the fiber optic cable is provided that may include a means for securing the input end of the fiber optic cable in relation to the light source so that the input end may receive the beam of light for transmission over the fiber optic cable. A fiber optic glass may be positioned between the input end of the fiber optic cable and the light source and a means for aligning the fiber optic glass with the input end of the fiber optic cable so that a respective diameter of the fiber optic glass and a respective diameter of the input end of the fiber optic cable reside in substantially the same cylindrical plane defined by the respective diameters.

A fiber optic illuminating apparatus is provided that may comprise a housing, a lamp assembly disposed within the housing and adapted to produce a beam of light, a fiber optic cable having an input end disposed to receive the beam of light produced by the lamp assembly, means for insulating the input end of the fiber optic cable from heat generated within the housing where the means for insulating is disposed between the input end of the fiber optic cable and the lamp assembly and a fiber head for retaining the means for insulating and aligning the input end of the fiber optic cable for receipt of the beam of light.

One aspect allows for the apparatus to include means for insulating the input end of a fiber optic cable, the means for insulating may be formed of a fiber optic glass having a melting temperature that is higher than a melting temperature of the input end of the fiber optic cable. The beam of light may be transmitted through the fiber optic glass wherein the fiber optic glass comprises a bundle of fused glass fibers. A light intensity profile of the beam of light may remain substantially linear as the beam of light passes through the fiber optic glass so that the beam of light is substantially collimated when it impinges on the input end of the fiber optic cable.

BRIEF DESCRIPTION OF THE DRAWINGS

FIG. 1 is a plan view of a fiber optic light source in accordance with one aspect of the present invention;

FIG. 4 is a perspective view of a collar adapted for quick connecting and disconnecting with the connector of FIG. 1.

FIG. 5 is a side view of a reducer that may be used to reduce the inside diameter of the bayonet.

DETAILED DESCRIPTION OF THE INVENTION

Figure 2:
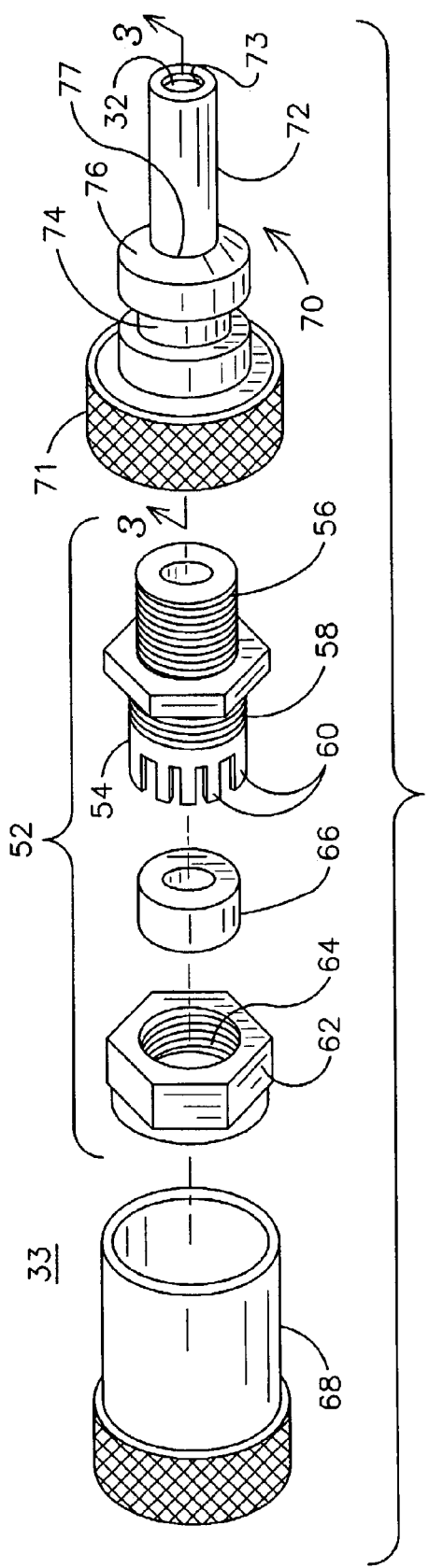
FIG. 2 is an exploded view of a fiber head assembly that may be used with the fiber optic light source of FIG. 1.

An illuminating apparatus, such as the fiber optic light source 10 illustrated in FIG. 1, is provided having a housing 12 including a generally horizontal base 14 mounted on a plurality of feet (not shown), four vertical side walls 16 attached to the base 14 along respective edges, and a top (not shown) generally parallel to the base 14 and removably connected along edges of the side walls 16 opposed the base 14. The housing 12 defines an interior space for the assembly of various other components of the apparatus 10. A generally vertical interior wall 18 may be attached at its respective edges to the base 14, two of the side walls 16, and the top to divide the interior space into a first interior volume 20 and a second interior volume 22 within the housing 12. An alternate embodiment allows for interior wall 18 to extend from one side wall 18 and truncate in the interior of housing 12 as more fully explained below. The housing 12 may be fabricated from sheet metal or other known materials by processes known in the art. Joints between the various portions of the housing 12 are preferably formed to be air tight, such as by soldering, welding, gluing, the use of gaskets, or by forming adjoining portions from a single piece of material. An optical member 24 may form a portion of the interior wall 18 for the purpose of allowing a beam of light to pass from the first interior volume 20 to the second interior volume 22, as will be discussed more fully below.

A lamp assembly 26 may be disposed within the first interior volume 20 and may be removably affixed to the base 14 at a predetermined position in alignment with the optical member 24. The lamp assembly 26 may receive electrical power from a power supply 28 through a wire 30, also disposed within the first interior volume 20. Lamp assembly 26 produces a beam of light that is directed through optical member 24 toward an input end 32 of a fiber head generally referred to as 33. Fiber head 33 may function as a means for securing an input end of a fiber optic cable or bundle 34 for receipt of the beam of light for transmission to a plurality of light emitting fixtures. The input end 32 of fiber head 33 may extend within the second interior volume 22. Fiber head 33 may be detachably connected at a predetermined position to one side wall 16 of housing 12 by a connector 36.

The heat energy produced by lamp assembly 26, power supply 28 and any other exothermic components that may be located within the first interior volume 20 may be removed from the housing 12 by a flow of cooling air 38. A fan 40 in fluid communication with the first interior volume 20 produces the flow of cooling air 38. The fan 40 may be mounted directly over an opening (not shown) located in the base 14 for drawing air into the first interior volume 20 and across the lamp assembly 26 and other exothermic components. The heated flow of cooling air 38 may then be directed out of the first interior volume 20 through one or more ventilation openings 42 formed in one of the walls 16. Those skilled in the art will appreciate that the cooling air inlet and outlet may be located at any convenient locations on housing 12 such as those locations where the heated air is not directly drawn back into the interior of the housing. Input end 80 of fiber head 33 may be isolated from the flow of cooling air 38 by interior wall 18. An alternate embodiment allows for interior wall 18 to truncate at a point within the interior of housing 12 to allow a portion of the flow of cooling air to circulate near the input end 80 of the fiber head 33 and/or vents may be provided at various points along interior wall 18 to allow some air to circulate to the second interior volume 22. The input end 80 of fiber head 33 may receive a significant amount of thermal energy from the lamp assembly 26 in the form of radiant energy. Optical member 24 may be a lens that focuses the beam of light produced by the lamp assembly 26 onto the input end 32, which concentrates the heating effect of the radiant energy. Optical member 24 may be formed to be an infrared filter to lessen the heating effect on the input end 32 of the fiber head 33. One or more optional ventilation openings 44 and 46 may be formed in one or more of the walls 16 to provide ventilation of the second interior volume 22.

FIG. 2 illustrates an exploded view of an exemplary fiber head 33 in accordance with one aspect of the invention. Fiber head 33 may be adapted to secure the fiber optic cable 34 to the housing 12. The fiber optic cable 34 is not illustrated in FIG. 2, but one may envision the cable 34 inserted through the center openings of the various pieces of fiber head 33, as will be described in more detail below. Fiber head 33 may include an internal clamp assembly 52 comprising a hollow double-ended connector 54 having a first threaded end 56 and a second end 58 threaded over a partial extent and having a distal portion containing a plurality of flexible longitudinal fingers 60. A connector cap 62 has internal threads 64 sized for engagement with the threads on the second end 58 of the clamp assembly 52. Connector cap 62 may also contain an internal taper (not shown) that compresses the longitudinal fingers 60 onto an inserted fiber optic cable 34 as the connector cap 62 is threaded onto the clamp assembly 52. An elastomeric washer 66 may fit within fingers 60 to protect the cable 34 and to distribute the force exerted by the fingers 60. A cover 68 may fit over the clamp assembly 52 by a friction fit to protect the various components. A bayonet portion 70 includes internal threads on a first end 71 sized for engagement with the external threads on the first threaded end 56 of the internal clamp assembly 52. An alignment cylinder portion 72 may be detachable from the bayonet 70 by means of internal threads on the proximate end 77 of cylinder 72 and respective external threads on a tapered portion 76 of the bayonet 70.

Assembly of fiber head 33 onto fiber optic cable 34 may be accomplished by sliding each of the respective pieces 68, 62, 66, 54, and 70 over an end of the cable 34. Connector cap 62 may be threaded onto double-ended connector 54 to provide a compression attachment to the cable 34. The bayonet portion 70 may then be threaded onto first threaded end 56 of double-ended connector 54. Cover 68 may slide over double-ended connector 54 to abut the first end 71 of the bayonet portion 70. One exemplary embodiment of the present invention allows for an input end 80 of the fiber optic cable 34 to be inserted within bayonet portion 70 to a position proximate a distal end 75 of a tapered portion 76 of the bayonet. For fiber optic cable 34 made of plastic, the input end 80 may be cut with a hot knife as is known in the art prior to being inserted within the bayonet 70. The alignment cylinder 72 may be removed from bayonet 70 while the remainder of fiber head 33 is being assembled. This allows for a visual inspection of the input end 80 of the fiber optic cable 34 to ensure proper alignment within bayonet 70 and/or detection of damaged fibers, for example. It also allows for a means for insulating the input end 80 and coupling the beam of light with the input end 80, such as a fiber optic glass 82, to be inserted within the alignment cylinder 72. One aspect allows for the alignment cylinder 72 to function as a means for aligning the fiber optic glass 82 with the input end 80 of cable 34 so that they reside within substantially the same cylindrical plane defined by the respective diameters of the input end 80 of cable 34 and the piece of fiber optic glass 82. Alternate embodiments allow for the input end 80 and glass 82 to have different diameters provided that the alignment cylinder 72 allows for a respective diameter of the beam of light passing through the glass 82 to be substantially collimated when it impinges on a respective diameter of the input end 80 of cable 34 that is substantially the same diameter as that of the beam of light.

The means for insulting protects input end 80 from heat generated within the housing 12 by the lamp assembly 26 and other exothermic components, for example, of the illuminating apparatus 10. One exemplary embodiment allows for the fiber optic glass 82 to comprise a cylindrical bundle of fused glass fibers. The fused glass fibers may range in diameter from at least about 100 microns to no greater than about 500 microns. The fiber optic glass 82 may have a length in the range of about 20 mm to 30 mm and a diameter in the range of between about 20 mm to 30 mm. One exemplary embodiment allows for the glass 82 to be approximately 25.8 mm in length and 21.2 mm in diameter and comprise fused glass fibers of approximately 300 microns. The inventors of the present invention have discovered that using a fiber optic glass 82 in accordance with one aspect of the present invention allows for a focal point to be established and maintained proximate a surface defining the input end 80 of the fiber optic cable 34 and that the fiber optic glass 82 maintains the integrity of light transmission from optical member 24 to the input end 80 so that a light intensity profile of light be transmitted through the glass 82 is substantially linear. In this respect, the intensity profile of light input into the distal or input end 81 of glass 82 is substantially the same as the intensity profile of light output from the opposite end of the glass 82 and transmitted into the input end 80 of the fiber optic cable 34. The alignment cylinder 72 may function as a means for aligning the fiber optic glass 82 with input end 80 and the optical member 24 so that light transmitted through glass 82 is substantially collimated when it impinges on input end 80.

Figure 3:
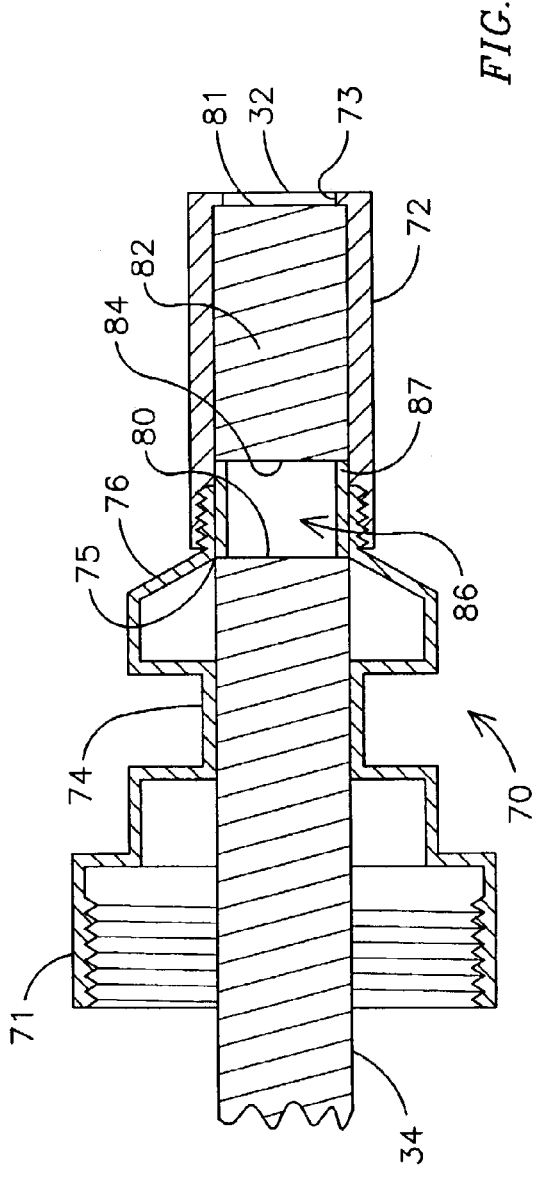
FIG. 3 is a cross sectional enlarged view taken along line A—A of a portion of the fiber head assembly of FIG. 2.

Fiber optic glass 82 may be inserted within the alignment cylinder 72 when the cylinder is detached from the bayonet 70. The glass 82 may have an outside diameter slightly smaller than the inside diameter of cylinder 72 so that the glass 82 rather freely slides into the cylinder or so that it is seated by a friction fit within the alignment cylinder 72. A raised ridge or stop 73 may be disposed around the cylinder's interior circumference to prevent glass 82 from being pushed or otherwise come out that end of the cylinder. One exemplary embodiment allows for bayonet 70 to be constructed of a material that will function as a means for dissipating heat, such as aluminum, for example. Those skilled in the art will recognize other material that may be used in this respect. The fiber optic glass 82 may have a melting temperature that is significantly greater than the fiber optic strands of the fiber optic cable 34. The high melting temperature of the fiber optic glass 82 provides an insulating barrier between the optical member 24 and the input end 80 of the fiber optic cable 34. For example, the illuminating apparatus 10 may generate high operating temperatures of approximately 800 degrees Fahrenheit. The fiber optic glass 82 adapted as an insulating barrier prevents the input end 80 from being exposed to operating temperatures sufficiently high that the ends of the fiber optic cables forming the input end 80 may melt or otherwise damage. As shown in FIG. 3, one exemplary embodiment allows for a proximate end 84 of the fiber optic glass 82 to be spaced from the input end 80 of the fiber optic cable 34 to form an insulating gap 86. The gap 86 provides an additional insulating barrier between the proximate end 84 of fiber optic glass 82 and the input end 80 of the fiber optic cable 34 due to the relatively poor thermal conductivity of air. This gap 86 is also spaced to allow for a focal point of light transmitting through glass 82 to be proximate the surface of input end 80. One embodiment allows for gap 86 to be approximately 4 mm and it may range between about 4-mm and 10-mm. A cylindrical spacer 87 made of conventional material, such as aluminum for example, may be inserted within the alignment cylinder 72 after the glass 82 is inserted to maintain the gap 86 when the alignment cylinder 72 is attached to the tapered portion 76 of the bayonet 70. The spacer 87 may have an inside diameter that is slightly less than an outside diameter of the glass 82 so that the glass cannot slide toward the input end 80 of cable 34 and virtually all light transmitted through glass 82 impinges on the input end 80.

It has been discovered by the inventors of the present invention that using the fiber optic glass 82 as an insulating barrier sufficiently protects input end 80 from heat generated within the illuminating apparatus 10, such as by the lamp assembly 26, so that alternate means are not necessary for cooling the fiber optic strands that make up the input end 80. For example, the illuminating apparatus 10 may be operated using fiber optic glass 82 wherein a second fan arrangement disclosed in U.S. Pat. No. 6,422,730 identified above and assigned to the assignee of the present invention is not necessary to cool the fiber ends at the input end 80 of the fiber optic cable 34. One significant commercial benefit of not using the second fan arrangement is that the noise associated with using the second fan arrangement is eliminated. This allows for various embodiments of the illuminating apparatus 10 of the present invention to be used in environments where operational noise needs to be maintained below threshold values.

FIG. 4 illustrates a collar 90 adapted for installation into an opening in the wall 16 of housing 12 of the illuminating apparatus 10 and to receive bayonet 70. Collar 90 includes a body 92 having a central opening 94 for receiving the alignment cylinder 72 of bayonet 70. The body 92 may be secured into an opening in a side wall 16 of housing 12 by any known mechanism, such as with screws threaded into holes (not shown) formed in the body 92. A spring-loaded pin 96 may be retained in an opening formed perpendicular to the central opening 94. Pin 96 may be spring biased to protrude into the central opening 94. The pin may be sized to fit into a groove 74 formed in the outside surface of bayonet 70 (as seen in FIG. 3) when the bayonet 70 is inserted to a desired position within collar 90. A taper 76 formed on the surface of the bayonet 70 facilitates the retraction of pin 96 as the bayonet 70 is inserted into the collar 90. The diameter of pin 96 is selected to be only slightly smaller than the width of groove 74, for example 0.010 inch smaller, in order to hold the input end 80 of fiber optic cable 34 close to a predetermined position. Similarly, the outside diameter of alignment cylinder 72 of bayonet 70 is selected to be only about 0.010 inch smaller than the inside diameter of the central opening 94 of collar 90. In this manner, fiber optic cable 34 can be quickly and accurately inserted into housing 12 to position input end 32 of the fiber head 33 at a desired position with respect to optical member 24 and lamp assembly 26 while maintaining the alignment of the fiber optic glass 82 with the input end 80 of the cable 34. The fiber optic cable 34 may be withdrawn by simply lifting pin 96 away from bayonet 70 and pulling the bayonet 70 out of collar 90.

FIG. 5 illustrates an exemplary reducer 100, which may be constructed of conventional material such as aluminum, that may be used for stepping down the inside diameter of the bayonet 70 to accommodate applications of the illuminating apparatus 10 where a reduction in the diameter of the light beam is desired or for other operational or performance reasons. One embodiment allows for a plurality of reducers 100 to be fabricated each with a different inside diameter for stepping down the inside diameter of the bayonet 70 from approximately 20 mm to approximately 10 mm. For example, this may be accomplished by inserting a respective one of three reducers configured with gradually decreasing diameters within the bayonet 70.

One aspect of the present invention allows for existing fixtures to be retrofit in accordance with various aspects of the present invention. Some existing fiber optic light sources such as one disclosed in U.S. Pat. No. 6,422,730 identified above may be retrofit in accordance with the present invention to provide a means for insulating the input end of a fiber optic bundle from heat so that a second fan arrangement may be removed from the light source to reduce the amount of noise produced by the unit. In this respect, an exemplary method of the present invention allows for a field technician to remove a fiber head, such as one constructed substantially the same as fiber head 33, from a light source in the field or removed to a maintenance facility, etc. The fiber head may include an extension, such as alignment cylinder 72, that secures an input end of a fiber optic cable 34 within the light source so that light transmitted through an optical member 24 impinges directly onto an input end of the cable 34. To illustrate this respect, the input end of the cable 34 would be substantially flush with the exposed end of the alignment cylinder 72. The fiber optic cable 34 may be removed from the fiber head 33 so that a means for insulating an input end of the fiber optic cable 34 may be inserted within the alignment cylinder 72 through the bayonet 70. One aspect allows for the cable 34 to be inserted into the bayonet 70 to a point so that the input end, such as input end 80 of FIG. 3, forms a gap 86. An alternate embodiment allows for the cable 34 to be shortened by means known in the industry such as by using a hot knife, for example, before being reinserted back into the fiber head 33. The means for insulating may be a piece of fiber optic glass 82 and it may be inserted directly into the bayonet portion 70 so that it is held within the extension 72 of the bayonet portion 70 or the extension 72 may be removed and the glass 82 inserted directly into the extension. A spacer 87 may be inserted within the bayonet 70 to maintain the gap 86 between a proximate end 84 of glass 82 and the input end 80 of the fiber optic cable 34. The cable 34 may be reinserted within the fiber head 33 so that the retrofit unit is configured in a manner consistent with the configuration shown in FIG. 3. The fiber head 33 may be reattached to the fiber optic light source, such as apparatus 10, and a second fan arrangement as shown in the '730 patent may be removed from the light source.

While the exemplary embodiments of the present invention have been shown and described by way of example only, numerous variations, changes and substitutions will occur to those of skill in the art without departing from the invention herein. Accordingly, it is intended that the invention be limited only by the spirit and scope of the appended claims.

I claim:

1. An illuminating apparatus comprising:
a housing;
a lamp assembly disposed within the housing and adapted to produce a beam of light;
a fiber optic bundle having an input end disposed to receive the beam of light produced by the lamp assembly;
means for insulating the input end disposed to receive the beam of light from the lamp assembly with the input end of the fiber optic bundle, the means for insulating and coupling comprising a fiber optic glass having a melting temperature that is sufficiently higher than a melting temperature of the input end of the fiber optic bundle to prevent a portion of the input end from melting up to an operating temperature of the illumination apparatus of approximately 800 degrees Fahrenheit; and
a fiber bundle to align the means for insulating and coupling between the input end of the fiber optic bundle and the lamp assembly so that the beam of light will be transmitted through the means for insulating and coupling and impinge the input end.

2. The apparatus of claim 1, wherein the means for insulating and coupling comprises a fiber optic glass disposed within the fiber head.

3. The apparatus of claim 2 wherein the fiber optic glass comprises a bundle of fused glass fibers.

4. The apparatus of claim 1 wherein the fiber head aligns the insulating and coupling means so that the beam of light passes through the insulating and coupling means such that an intensity profile of the beam of light is substantially linear.

5. An illuminating apparatus comprising:
a housing;
a lamp assembly disposed within the housing and adapted to produce a beam of light;

a fiber optic bundle having an input end disposed to receive the beam of light produced by the lamp assembly;

means for insulating the input end of the fiber optic bundle from heat generated within the housing and coupling the beam of light from the lamp assembly with the input end of the fiber optic bundle;

a fiber head adapted to align the means for insulating and coupling between the input end of the fiber optic bundle and the lamp assembly so that the beam of light will be transmitted through the means for insulating and coupling and impinge the input end; wherein the input end of the fiber optic bundle has a first melting temperature;

the means for insulating and coupling has a second melting temperature; and the second melting temperature is higher than the first melting temperature.

6. An illuminating apparatus comprising:

a housing;

a lamp assembly disposed within the housing and adapted to produce a beam of light;

a fiber optic bundle having an input end disposed to receive the beam of light produced by the lamp assembly;

means for insulating the input end of the fiber optic bundle from heat generated within the housing and coupling the beam of light from the lamp assembly with the input end of the fiber optic bundle;

a fiber head adapted to align the means for insulating and coupling between the input end of the fiber optic bundle and the lamp assembly so that the beam of light will be transmitted through the means for insulating and coupling and impinge the input end; and the means for insulating and coupling comprise a fiber optic glass;

the fiber head comprising an alignment cylinder and a means for detachably connecting the fiber head to the housing and wherein the fiber optic glass is disposed within the alignment cylinder.

7. The apparatus of claim 6, the fiber optic glass comprising a fused bundle of glass fibers having diameters ranging between about 100 microns and 500 microns.

8. The apparatus of claim 6 wherein the beam of light has a first intensity profile as it is input into the fiber optic glass and a second intensity profile as it is output from the fiber optic glass and wherein the fiber optic glass is adapted so that the first intensity is substantially the same as the second intensity profile.

9. The apparatus of claim 8 wherein the beam of light output from the fiber optic glass is substantially contacted when it impinges the input end of the fiber optic cable.

10. An illuminating apparatus comprising:

a housing;

a lamp assembly disposed within the housing and adapted to produce a beam of light;

a fiber optic bundle having an input end disposed to receive the beam of light produced by the lamp assembly;

means for insulating the input end of the fiber optic bundle from heat generated within the housing and coupling the beam of light from the lamp assembly with the input end of the fiber optic bundle;

a fiber head adapted to align the means for insulating and coupling between the input end of the fiber optic bundle and the lamp assembly so that the beam of light will be transmitted through the means for insulating and coupling and impinge the input end wherein the input end of the fiber optic bundle has a first melting temperature and the insulating and coupling means provides sufficient insulation to maintain the fiber optic bundle below the first melting temperature.

11. The apparatus of claim 10, wherein the insulating and coupling means provides sufficient insulation to maintain the fiber optic bundle below the first melting temperature when the illuminating apparatus is operating with an operating temperature of up to about 800 degrees Fahrenheit.

12. A method for retrofitting a fiber optic light source with a means for insulating an input end of a fiber optic cable against heat generated during operation of the light source, the means for insulating allowing for a beam of light to pass from a lamp assembly within the light source to the input end of the cable; the method comprising:

removing a fiber head from the light source, the fiber head adapted to hold the input end of the fiber optic cable;

removing the fiber optic cable from the fiber head;

inserting the means for insulting the input end of the fiber optic cable into the fiber head;

inserting the input end of the fiber optic cable into the fiber head; and connecting the fiber head to the light source so that the means for insulating is positioned between the input end of the fiber optic cable and a lamp assembly within the fiber optic light source; and inserting a spacer within the fiber head to maintain a gap between the input end of the fiber optic cable and a proximate end of the insulating means.

13. A method for retrofitting a fiber optic light source with a means for insulating an input end of a fiber optic cable against heat generated during operation of the light source, the means for insulating allowing for a beam of light to pass from a lamp assembly within the light source to the input end of the cable; the method comprising:

removing a fiber head from the light source, the fiber head adapted to hold the input end of the fiber optic cable;

removing the fiber optic cable from the fiber head;

inserting the means for insulting the input end of the fiber optic cable into the fiber head;

inserting the input end of the fiber optic cable into the fiber head; and connecting the fiber head to the light source so that the means for insulating is positioned between the input end of the fiber optic cable and a lamp assembly within the fiber optic light source;

wherein the insulating means is a fiber optic glass.

14. The method of claim 13, the fiber optic glass comprising a fused bundle of glass fibers having diameters ranging between about 100 microns and 500 microns.

* * * * *